United States Patent
Auberger et al.

(10) Patent No.: US 9,092,661 B2
(45) Date of Patent: Jul. 28, 2015

(54) FACIAL FEATURES DETECTION

(75) Inventors: Stéphane Auberger, Noisy-le-Grand (FR); Adrien Graton, Brunoy (FR)

(73) Assignee: ST-Ericsson SA, Plan-les-Ouates (CH)

( * ) Notice: Subject to any disclaimer, the term of this patent is extended or adjusted under 35 U.S.C. 154(b) by 64 days.

(21) Appl. No.: 13/884,084

(22) PCT Filed: Nov. 14, 2011

(86) PCT No.: PCT/EP2011/070079
§ 371 (c)(1),
(2), (4) Date: May 8, 2013

(87) PCT Pub. No.: WO2012/062933
PCT Pub. Date: May 18, 2012

(65) Prior Publication Data
US 2013/0251202 A1    Sep. 26, 2013

Related U.S. Application Data

(60) Provisional application No. 61/421,521, filed on Dec. 9, 2010.

(30) Foreign Application Priority Data

Nov. 12, 2010  (EP) .................................. 10306248

(51) Int. Cl.
*G06K 9/00* (2006.01)
(52) U.S. Cl.
CPC ........ *G06K 9/00281* (2013.01); *G06K 9/00248* (2013.01)
(58) Field of Classification Search
None
See application file for complete search history.

(56) References Cited

U.S. PATENT DOCUMENTS

| | | | | |
|---|---|---|---|---|
| 7,035,456 | B2* | 4/2006 | Lestideau | 382/164 |
| 7,352,881 | B2* | 4/2008 | Lestideau | 382/103 |
| 8,437,516 | B2* | 5/2013 | Song et al. | 382/118 |
| 8,588,481 | B2* | 11/2013 | Lee | 382/118 |
| 8,750,574 | B2* | 6/2014 | Ganong et al. | 382/115 |
| 8,913,830 | B2* | 12/2014 | Sun et al. | 382/173 |
| 2003/0053685 | A1* | 3/2003 | Lestideau | 382/164 |

(Continued)

FOREIGN PATENT DOCUMENTS

EP    1630718 A1    3/2006

OTHER PUBLICATIONS

Gottumukkal, R. et al., "An improved face recognition technique based on modular PCA approach", Pattern Recognition Letters, Mar. 1, 2004, pp. 429-436, vol. 25, Issue 4, Elsevier, US.

(Continued)

*Primary Examiner* — Nancy Bitar
(74) *Attorney, Agent, or Firm* — Coats & Bennett, P.L.L.C.

(57) ABSTRACT

There is described a method for facial features detection in a picture frame containing a skin tone area, comprising dividing (12) the skin tone area into a number of parts; and for each part of the skin tone area, constructing (14) a luminance map, constructing an edge map by extracting (18) edges from the luminance map, defining (20) an edge magnitude threshold, building (22) a binary map from the edge map by keeping only the edges having a magnitude beyond the defined edge magnitude threshold and eliminating the others; and then extracting (24) facial features from the built binary map. An inter-related facial features detector is further described.

14 Claims, 2 Drawing Sheets

(56) References Cited

U.S. PATENT DOCUMENTS

2004/0109584 A1* 6/2004 Lestideau ............... 382/103
2008/0219558 A1 9/2008 Lu et al.

OTHER PUBLICATIONS

Goyal, S., "Threshold Analysis of Human Faces under Different Spectral & Lighting Conditions", Conference publication, IEEE 9th International Multitopic Conference, Dec. 24, 2005, pp. 1-3, IEEE.

Yang, M. et al., "Face Detection and Gesture Recognition for Human-Computer Interaction", Detecting Faces in Still Images, 2001, pp. 21-26, Kluwer Academic Publishers, US.

Yang, M. et al., "Face Detection and Gesture Recognition for Human-Computer Interaction", Detecting Faces in Still Images, 2001, pp. 12-15, Kluwer Academic Publishers, US.

McIlroy, C. D. et al, "Hardware for real-time image processing", Computers and Digital Techniques, IEE Proceedings E, Nov. 1, 1984, pp. 223-229, vol. 131, Issue 6, IEEE.

Parker, J. R., "Algorithms for image processing and computer vision", Nov. 25, 1996, pp. 116-149, XP 002633331John Wiley & Sons, New York, US.

Pratt Digital Image Processing: PIKS Scientific Inside, Jan. 1, 2001, pp. 29-33, 443, 456, 463-469, XP-002374598, John Wiley & Sons, US.

Johnson, R. P. "Contrast Based Edge Detection", 1023 Pattern Recognition, Jan. 1, 1990, pp. 311-318, vol. 23, Issues 3-4, XP-000115581, Elsevier, GB.

* cited by examiner

FACIAL FEATURES DETECTION

BACKGROUND

1. Technical Field

The present invention generally relates to devices and methods for facial features detection in pictures. It finds application, in particular, in mobile devices such as mobile phones.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Face detection has been the subject of many researches and developments for many years. Many approaches have been developed in order to obtain real-time robust face detection. In the case of mobile phones, these solutions typically require the use of either (or both of) dedicated hardware or strong Central Processing Unit (CPU) capabilities, which is typically available only on high-end feature phones or smart phones.

Thus, there is a need for alternative face detection algorithms. Such algorithms may target a low CPU use on a low-cost mobile platform, without dedicated hardware for example.

SUMMARY

To address at least some of the above needs and other problems of the prior art, a first aspect of the present invention relates to a method for facial features detection in a picture frame containing a skin tone area, comprising:
  dividing the skin tone area in a number of parts; and
for each part of the skin tone area:
  constructing a luminance map;
  constructing an edge map by extracting edges from the luminance map;
  defining an edge magnitude threshold;
  building a binary map from the edge luminance map by keeping only the edges having a magnitude beyond the defined edge magnitude threshold and eliminating the others; and then
  extracting facial features from the built binary map.

Thus, dividing the potential skin tone area into a given number of parts enables to reduce the impact of uneven lighting on the face.

It shall be noted that the expression "beyond" can mean that the magnitude is greater than the edge magnitude threshold value in some embodiments, and smaller than this threshold value in other embodiments.

In some embodiments, the predetermined number of parts is equal to four, each part representing a respective quarter of the skin tone area. Thus, four respective edge magnitude thresholds are used to build the binary map quarter by quarter. This approach allows overcoming an issue due to the fact that edges of the mouth are generally weaker than those of the eyes as will be described in the following description.

For instance, for each part of the skin tone area, the edge magnitude threshold is calculated so as to keep a given percentage, e.g. the top ten percent of edges based on their ranked edge magnitude values when building the binary map. Stated otherwise, the edge magnitude threshold may be applied to the edge map to convert it into binary by retaining the edges beyond that threshold.

By keeping only the strongest edges of the face, the most significant features of the face, such as the eyebrows, the eyes, the mouth and the nostrils are typically clearly visible.

In one embodiment, the method for facial features detection further comprises calculating an average luminance within the skin tone area and defining an absolute rejection threshold dependent on the calculated average luminance, wherein in each part of the skin tone area, only the edges further having a magnitude beyond than the absolute rejection threshold are kept for building the binary map. Stated otherwise, the absolute rejection threshold may be used to reject edges that are too small.

Here again, it shall be noted that the expression "beyond" can mean that the magnitude is greater than the absolute rejection threshold value in some embodiments, and smaller than this threshold value in other embodiments.

The absolute rejection threshold allows rejecting even the top ten percent of edges if these edges are not strong enough. This feature permits to avoid using edges that are more related to noise in untextured areas and thus to reduce false detections. By choosing an absolute rejection threshold depending on the average luminance, the features detection is adapted to any kind of background and lighting, allowing good edge detection for a face in backlight lighting where edges corresponding to the facial feature are difficult to detect and have a low absolute value (because the face is darker), without increasing the false detections in other well-lighted low-textured areas, for example.

In some embodiments, the step of extracting edges comprises the application of two differential filters to extract horizontal and vertical edges from the luminance map.

Thus, a very simple edge detection filter on the luminance image is used for the extraction.

In some embodiments, the kept edges for building the binary map are only horizontal edges.

In fact, eyes and mouth usually present more horizontal edges than the rest of the face. By keeping the strongest horizontal edges, these features are thus clearly visible.

In some embodiments, the method of facial features detection further comprises a step of down-sampling the luminance map in each part of the skin tone area prior to the step of extracting edges.

This down-sampling allows reducing the amount of data to be processed.

Moreover, the method for facial features detection advantageously comprises a step of delimiting the skin tone area by an ellipse having a height h and a width w.

Restricting the extraction to the inscribed ellipse comprising skin pixels of the potential face avoids the consideration of outline edges in the binary map, as for example, edges belonging to a textured background.

In some embodiments, the step of extracting facial features comprises extracting eyes from two kept horizontal edges defining an eye line and each having a width less than X located on the top half part of the ellipse, both horizontal edges being distant from each other with a distance d1 verifying $a1 \times w < d1 < b1 \times w$ and extracting a mouth from one kept horizontal edge located on the bottom half part of the ellipse, said horizontal edge being distant from the eye line with a distance d2 verifying $a2 \times h < d2 < b2 \times w$, where a1, b1, a2, b2 and X are suitable parameters, either constant or adaptive.

This feature allows detecting the mouth and the eyes with a good precision.

A second aspect of the present invention relates to a computer program product comprising one or more stored sequences of instructions that are accessible to a processor and which, when executed by the processor, cause the processor to perform the steps of the method for facial features detection of the first aspect of the invention.

A third aspect of the present invention relates to a device, called a facial features detector, configured to perform the steps of the method for facial features detection of the first aspect of the invention.

A fourth aspect of the present invention relates to a mobile phone comprising a device according to the third aspect of the invention.

BRIEF DESCRIPTION OF THE DRAWINGS

Embodiments of the invention are illustrated by way of example, and not by way of limitation, in the figures of the accompanying drawings, in which like reference numerals refer to similar elements and in which.

DESCRIPTION OF EMBODIMENTS

Figure 1:
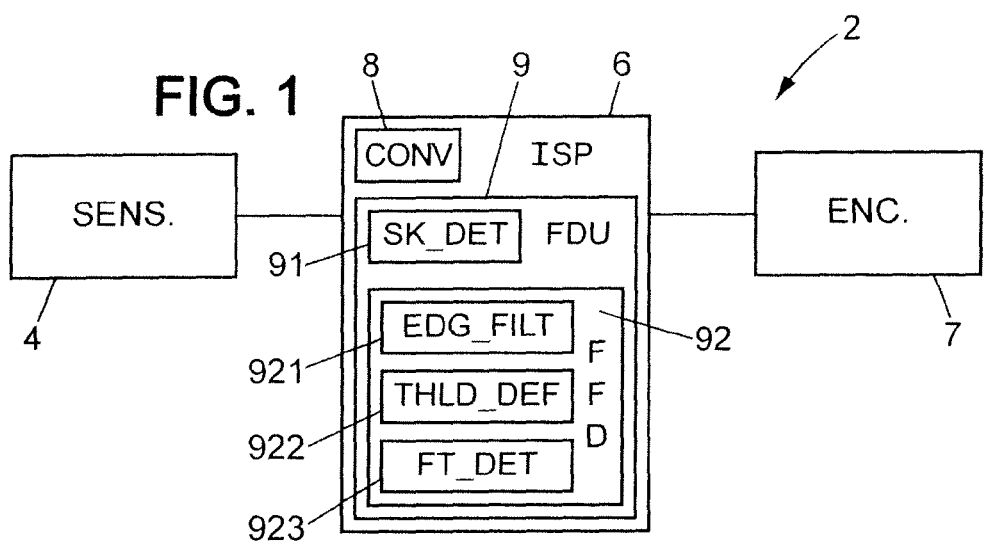
FIG. 1 is a schematic view of a device for facial features detection adapted to implement at least some embodiments of the invention.

Faces are in general characterized by their chromatic homogeneity and the strong edges around the facial features such as the eyes and the mouth. Therefore, face detection algorithms may be based on a first step of skin tone detection, using the chromatic composition of images to perform a real-time face detection.

Areas of a picture frame containing skin, named skin tone areas, are detected in a Skin Detection (SD) step, and then processed in a second step named Facial Feature Detection (FFD) step. FFD is aimed at checking whether the extracted skin tone areas indeed contain faces or not. Typically, this is achieved by searching for facial features such as eyes and mouth. This search may be based on considerations of edges and/or dark areas.

To detect eyes and mouth inside a skin tone area, a method that detects the edges may be used. Usually, the most significant edges are associated with the eyes and the mouth, and perhaps with nostrils and eyebrows.

In typical face detection systems, the presence of significant edges representing the eyes and the mouth is checked. If these edges are well placed and present symmetrical characteristics (e.g., eyes of similar shape, sizes of elements such as eyes and mouth, positions of eyes with respect to the mouth and/or inside the skin blob, etc.) the considered skin tone area is validated as a face.

Some typical algorithms for facial features detection construct a binary map from the luminance image of the picture by extracting representative pixels for feature detection. The expression "binary map", or "bit map", is commonly meant to refer to a series of bits used to identify the presence (denoted by, e.g., 1) or absence (denoted by, e.g., 0) of an edge pixel.

This binary map may be obtained through a thresholding of the edge image associated to the luminance image. Connected components extraction may then [ke1] be performed on this binary map, and the obtained components (typically horizontal stripes) may be referred to as candidate features. By using one or more various criteria, one of the detected components may be identified as the eye line, i.e., a (typically horizontal) stripe containing the eyes. When the eye line is found, the FFD process may try to detect the mouth as one of the remaining candidate features below the eye line.

One difficulty related to this process is to find a suitable threshold that will allow making visible the mouth and both the eyes in the binary map. For example, the strongest edges may only be retained under criteria leading to many candidate features within the binary map. If there are too many candidate features inside the binary map, it becomes more difficult to extract the eyes and mouth. However, taking only the strongest edges can still lead to false detections, particularly in low textured regions such as walls, skies, etc., where the strongest edges, however small in absolute values, could present an aspect similar to those of eyes and mouth.

Another difficultuy is to find a suitable algorithm that will allow making visible mainly both the eyes and the mouth in the binary map. If there are too many candidate features inside the binary map, it becomes more difficult to extract the eyes and mouth. Low textured regions such as walls, skies, etc. should also be taken care of. This is because in such regions, an edge detection process could easily extract features, that, once binarized, may be confused with eyes and mouth by the face detection algorithm, leading to false detections.

Thus, another difficulty is that edge maps may also contain edges not belonging to the face but to a textured background behind it that is somehow included in the skin tone area. Such edges could disturb the threshold determination, and thus the Facial Feature Detection algorithm.

Another difficulty is that the edges of the mouth are generally weaker than those of the eyes, making it difficult to extract both features properly through a single threshold.

Yet another difficulty is that lighting problems arise for faces that are not well lighted or that are unevenly lighted. In these cases, the significant edges are all located in the part of the frame that is strongly lighted. Therefore, a facial feature (such as an eye) which is not well lighted may not appear at all in the binary map. In this case, the face is typically not recognized by the Facial Feature Detection process.

Referring to FIG. 1, there is shown therein a schematic view of a device 2 for facial features detection according to embodiments of the present invention.

The device 2 may comprise a light sensor 4 which outputs light pixels in a first colour space. Instead of, or in addition to the light sensor, at least one other image source (e.g. other image capturing device or a memory where an image is stored, or an image input port where an image signal is fed from another device, etc), may provide the light pixels. In the following description, we will consider embodiments wherein light pixels are sensed by a light sensor. However, some features that will be described below may not be needed in some other embodiments, e.g. if an image is already captured or stored in an appropriate color space.

The device 2 also comprises an Image Signal Processor, ISP, 6 which processes the sensed light pixels to provide image data to an encoder 7 which encodes these data for a further display, for example.

The Image Signal Processor 6 may comprise a converter 8 which converts the sensed light pixels from the first colour space, for example the (R,G,B) colour space to a second colour space, for example the (Y,U,V) colour space. As will be understood by the one with ordinary skills in the art, however, such a converter may not be needed in some embodiments, e.g. if an image has already been captured or stored in an appropriate color space.

The Image Signal Processor 6 may also comprise a face detection unit (FDU) 9 that comprises a skin tone detector (SK-DET) 91 and a facial features detector (FFD) 92. The facial features detector 92 comprises at least one edge filter (EDG-FILT) 921, a threshold definition unit (THLD_DEF) 922 and a feature detector (FT_DET) 923. The operation of these elements will be explained in further detail below, with reference to the flow chart of FIG. 2.

The face detection unit 9 may also allow dynamic settings and corrections during the recording or acquisition of a video or a picture such as an auto-white balance (AWB), an auto-focus (AF) and an auto-exposure (AE). These three settings and corrections are commonly named "the 3A".

One of the advantages of some embodiments of the invention is that the face detection means 9 may be able to detect facial features even if the lighting on the face is inhomogeneous.

Figure 2:
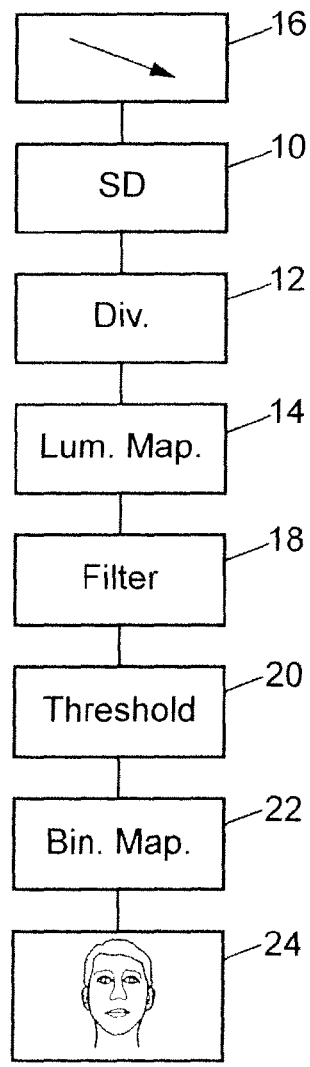
FIG. 2 is a flow chart illustrating steps of a method for facial features detection according to some embodiments of the invention.

The flow chart of FIG. 2 illustrates steps of facial features detection in a picture frame according to some embodiments.

The first step carried out on the frame is at step 16, wherein the constructed luminance map is down-sampled. This step allows reducing the amount of data to be processed. It is not mandatory, and provides an advantageous effect only where processing capacity is limited.

Figure 3:
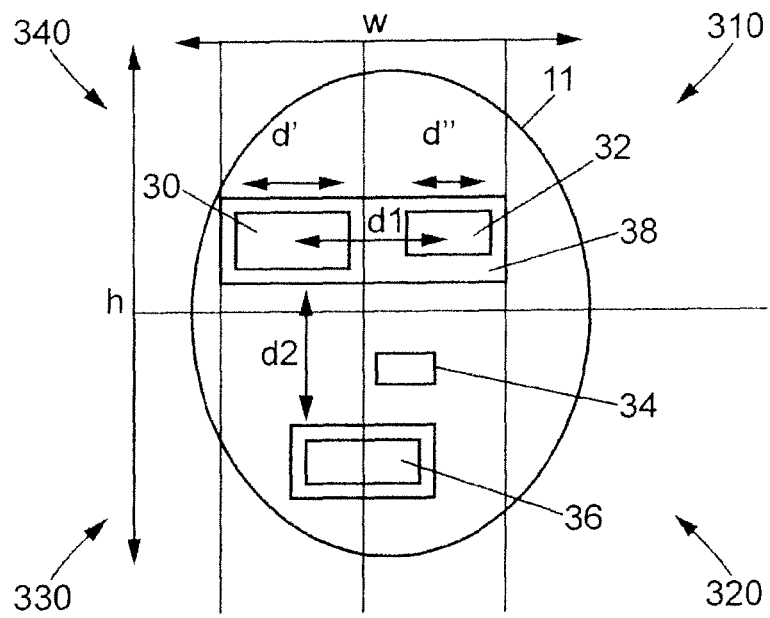
FIG. 3 is a schematic graph illustrating embodiments of the method for facial features detection.

Then, a skin tone detection step 10 is carried out that extracts skin tone areas, i.e., different connected skin areas contained in the frame. In some embodiments, each detected skin tone area is delimited by an ellipse having a height h and a width w. Such an ellipse 11 inscribed in the skin tone area is represented in FIG. 3.

This skin detection step 10 may be carried out by the skin tone detector 91 of FIG. 1.

Each detected skin tone area is then divided at step 12 in a number of parts, for instance four parts, each corresponding to, for example, a respective quarter in the skin tone area. As shown in FIG. 3, a skin tone area 11 may thus be divided in a first part 310 corresponding to the top-right quarter of the area 11, a second part 320 corresponding to its bottom-right quarter, a third part 330 corresponding to its bottom-left quarter and a fourth part 340 corresponding to its top-left quarter. Of course, any other number of parts may be considered, e.g., two parts which may respectively correspond to the left and right halves, or to the top and bottom halves, of the skin tone area 11.

The number of parts may be predetermined, for instance four or two as in the examples mentioned above. In a variant, however, the number of parts in which the skin tone area is divided may be adaptive. This may prove advantageous to take into account some intrinsic characteristics of the image data to be processed, and/or to take advantage of some algorithms of data processing be they either readily available or to become available in future.

Back to FIG. 2, for each part of the detected skin tone area, the following processing is then carried out.

At step 14, a luminance map is constructed. The luminance map gives the luminance value of each pixel within the skin tone area.

Then, at step 18, horizontal and/or vertical edges are extracted from the luminance map by applying at least one (e.g., two) differential filter(s) having, for example, the coefficients −1, 0, 1. This step may be carried out by the edge filter 921 of FIG. 1, in which said differential filter(s) is (are) comprised.

At step 20, in each part, an edge magnitude threshold is computed in order to keep only the most significant horizontal edges for further processing whereas the other edges are eliminated. In a variant, vertical edges may be considered in replacement of, or in addition to the horizontal edges.

According to some embodiments, the edge magnitude threshold for each part of the skin tone area is so defined that a given percentage, e.g. the top ten percent of the edges having magnitude values beyond (let us say above as a matter of non limiting example) said threshold, are kept. Any percentage other than 10% may be considered, preferably within a range between 5% and 20%, depending on the performances to be achieved in terms of accuracy of the edge detection.

In some embodiments, an average luminance of each detected skin tone area is also calculated at step 20. An absolute rejection threshold is then defined dependent on the calculated average luminance. Indeed, a low average luminance value means a dark face. In such situations it may be beneficial to lower the absolute rejection threshold as compared to a high luminance average value. More generally speaking, the dependency of the threshold on the average luminance value is typically such that the lower the average luminance value, the lower the absolute rejection threshold.

In one example, if the average luminance is less than 64 then the absolute rejection_threshold value may equal 5; if the average luminance is above 128 then the absolute_threshold value may equal 8; for values of the average luminance in between 64 and 128, there might be a linear interpolation of the absolute rejection_threshold value between 5 and 8.

In other embodiments, other dependencies might be considered. For example another metric than luminance may be used and the dependency between the threshold value and the metric may be either in proportion to each other or inversely in proportion.

In each part of the skin tone area, only the edges having a magnitude greater than the absolute rejection threshold are kept for further processing according to some embodiments. Thus, even the top ten percent strongest edges of one part may be eliminated if their magnitude value is less than the absolute rejection threshold.

The edge magnitude threshold and/or the absolute rejection threshold may be defined by the threshold definition unit 922 of FIG. 1.

The kept horizontal edges whose magnitude is simultaneously greater than the absolute rejection threshold and than the edge magnitude threshold of the corresponding part of the skin tone area are used for building a binary map at step 22. The binary map contains only binary values, i.e., a value of one if the magnitude value of the pixel satisfies both above conditions or a value of zero if one of the above conditions is not satisfied.

Then, at step 24, facial features are extracted from the binary map, by the feature detector 923 of FIG. 1. The one with ordinary skills in the art will identify that this step may be carried out by using any suitable method for facial features extraction either known in the current state of art or developed in the future. Such methods are typically based on facial feature extraction algorithms the description of which would go beyond the scope of the present description.

For instance, FIG. 3 shows the extraction of eyes and mouth from a detected skin tone area delimited by the ellipse 11.

In the shown example, four horizontal edges 30, 32, 34 and 36 satisfy the above conditions, i.e., their magnitude values are greater than the defined threshold of their respective quarters and than the absolute threshold.

The areas 30 and 32, both containing e.g. horizontal edges, are located at the same horizontal level on the top half part of the ellipse 11. They define a linearly extending area 38, also called an "eye line" in the jargon of the one with ordinary skills in the art.

The edge in area 30 has a width d' and the edge in area 32 has a width d". Besides, edges of 30 and 32 are distant from each other by a distance d1.

The edge contained in area 36, located in the bottom half part of the ellipse 11, is distant from the eye line 38 with a distance d2.

The map is processed to recognize eyes and mouth based on various criterion involving their sizes and respective distances. As an example, and assuming that a1, b1 and X are suitable parameters (either constant or adaptive), if the distances d', d'' and d1 verify all the following conditions $$d' < X;$$

$$d'' < X; \text{ and}$$

$$a1 \times w < d1 < b1 \times w,$$

then the edges 30 and 32 may be concluded to correspond to the eyes.

If, furthermore, d2 verifies $a2 \times h < d2 < b2 \times w$, then the edge 36 may be concluded to corresponds to a mouth, where a2 and b2 are other suitable parameters (either constant or adaptive).

For instance, if the edge 34 does not satisfy the above conditions because the distance between this edge 34 and the eye line 35 is lower than $a2 \times h$, then it may be concluded that the edge 34 does not correspond to a mouth.

The detection of the eyes 30, 32 and of the mouth 36 by the above method permits to validate that the considered skin tone area comprises a face.

Figure 4:
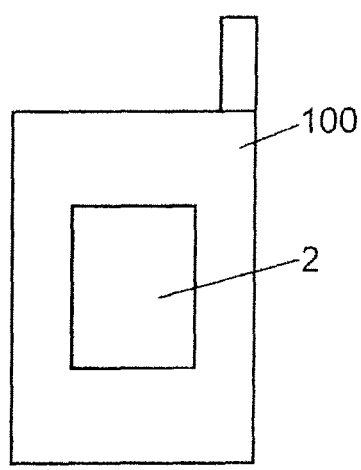
FIG. 4 is a schematic view of a mobile phone comprising the device of FIG. 1.

FIG. 4 illustrates a mobile phone 100 comprising a device 2 as described with reference to FIG. 1.

Embodiments of the present invention can also be embedded in a computer program product, which comprises all the features enabling the implementation of the method described herein, and which—when loaded in an information processing system—is able to carry out this method. Computer program means or computer program in the present context mean any expression, in any language, code or notation, of a set of instructions intended to cause a system having an information processing capability to perform a particular function either directly or after a conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

While there has been illustrated and described embodiments of the present invention, it will be understood by those skilled in the art that various other modifications may be made, and equivalents may be substituted, without departing from the true scope of the present invention. Additionally, many modifications may be made to adapt a particular situation to the teachings of embodiments of the present invention without departing from the scope of the invention. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method for facial features detection in a picture frame containing a skin tone area, comprising:
   dividing the skin tone area into a number of parts, the number being greater than one; and
   for each of the parts of the skin tone area:
   constructing a respective luminance map;
   constructing a respective edge map by extracting edges from the luminance map;
   defining a respective edge magnitude threshold based on the edge map, the edge magnitude threshold defining a boundary between a top N percent of the edges and the remaining edges in the edge map;
   building a respective binary map from the edge map that includes edges having a magnitude beyond the defined edge magnitude threshold and excludes edges having a magnitude not beyond the edge magnitude threshold;
   calculating a respective average luminance within the skin tone area;
   defining a respective absolute rejection threshold based on the calculated average luminance;
   determining if any edges in the binary map have a magnitude beyond the edge magnitude threshold but not beyond the absolute rejection threshold;
   if any edges in the binary map have a magnitude beyond the edge magnitude threshold but not beyond the absolute rejection threshold, excluding those edges from the binary map; and
   extracting facial features from the built binary map;
   wherein different edge magnitude thresholds are defined for at least two of the skin tone areas; and
   wherein different absolute rejection thresholds are defined for at least two of the skin tone areas.

2. The method of claim 1, wherein the number of parts is equal to four, with each part representing a respective quarter of the skin tone area.

3. The method of claim 1, wherein the extracting edges comprises the application of at least one differential filter to extract horizontal edges, vertical edges, or both, from the respective luminance maps.

4. The method of claim 3, wherein the differential filter has the coefficients −1, 0, 1.

5. The method of claim 1, wherein the kept edges for building the binary map are only horizontal edges.

6. The method of claim 1, wherein the skin tone area is delimited by an ellipse having a height and a width.

7. A computer program product stored in a non-transitory computer readable medium, the computer program product comprising one or more stored sequences of instructions for facial feature detection in a picture frame containing a skin tone area, the computer program product being loadable into a processing circuit and configured to cause the processing circuit to:

divide the skin tone area into a number of parts, the number being greater than one; and for each of the parts of the skin tone area:

construct a respective luminance map;

construct a respective edge map by extracting edges from the luminance map;

define a respective edge magnitude threshold based on the edge map, the edge magnitude threshold defining a boundary between a top N percent of edges and the remaining edges in the edge map;

build a respective binary map from the edge map that includes edges having a magnitude beyond the defined edge magnitude threshold and excludes edges having a magnitude not beyond the edge magnitude threshold;

calculate a respective average luminance within the skin tone area;

define a respective absolute rejection threshold based on the calculated average luminance;

determine if any edges in the binary map have a magnitude beyond the edge magnitude threshold but not beyond the absolute rejection threshold;

if any edges in the binary map have a magnitude beyond the edge magnitude threshold but not beyond the absolute rejection threshold, exclude those edges from the binary map; and extract facial features from the built binary map;

wherein different edge magnitude thresholds are defined for at least two of the skin tone areas; and wherein different absolute rejection thresholds are defined for at least two of the skin tone areas.

8. A facial features detector comprising one or more processing circuits configured to:

divide a skin tone area contained in a picture frame into a number of parts, the number being greater than one; and for each of the parts of the skin tone area:

construct a respective luminance map;

construct a respective edge map by extracting edges from the luminance map;

define a respective edge magnitude threshold based on the edge map, the edge magnitude threshold defining a boundary between a to N percent of edges and the remaining edges in the edge map;

build a respective binary map from the edge map that includes edges having a magnitude beyond the defined edge magnitude threshold and excludes edges having a magnitude not beyond the edge magnitude threshold;

calculate a respective average luminance within the skin tone area;

define a respective absolute rejection threshold based on the calculated average luminance;

determine if any edges in the binary map have a magnitude beyond the edge magnitude threshold but not beyond the absolute rejection threshold;

if any edges in the binary map have a magnitude beyond the edge magnitude threshold but not beyond the absolute rejection threshold, exclude those edges from the binary map; and extract facial features from the built binary map;

wherein different edge magnitude thresholds are defined for at least two of the skin tone areas; and wherein different absolute rejection thresholds are defined for at least two of the skin tone areas.

9. The facial features detector of claim 8, wherein the one or more processing circuits are configured as:

a skin tone area divider configured to divide the skin tone area into the number of parts;

a luminance map constructor configured to construct the respective luminance maps;

an edge map constructor configured to construct the respective edge maps by extracting edges from the respective luminance maps;

a first threshold definition unit configured to define the respective edge magnitude thresholds;

a binary map builder configured to build the respective binary maps from the respective edge maps by keeping only edges having a magnitude beyond the defined edge magnitude threshold and eliminating the others; and a feature detector configured to extract facial features from the built binary maps.

10. The facial features detector of claim 8, wherein the one or more processing circuits are further configured as at least one differential filter configured to extract horizontal and/or vertical edges from the respective luminance maps.

11. The facial features detector of claim 8, wherein the detector is included in an electronic device.

12. The method of claim 1, wherein the number of predetermined parts is a predetermined number.

13. The computer program product of claim 7, wherein the number of predetermined parts is a predetermined number.

14. The facial features detector of claim 8, wherein the number of predetermined parts is a predetermined number.

* * * * *